Oct. 31, 1933.   E V. TAYLOR   1,932,916
BRAKE
Original Filed Oct. 30, 1926   2 Sheets-Sheet 1

INVENTOR
Eugene V. Taylor
BY
ATTORNEY

Oct. 31, 1933.  E. V. TAYLOR  1,932,916
BRAKE
Original Filed Oct. 30, 1926  2 Sheets-Sheet 2
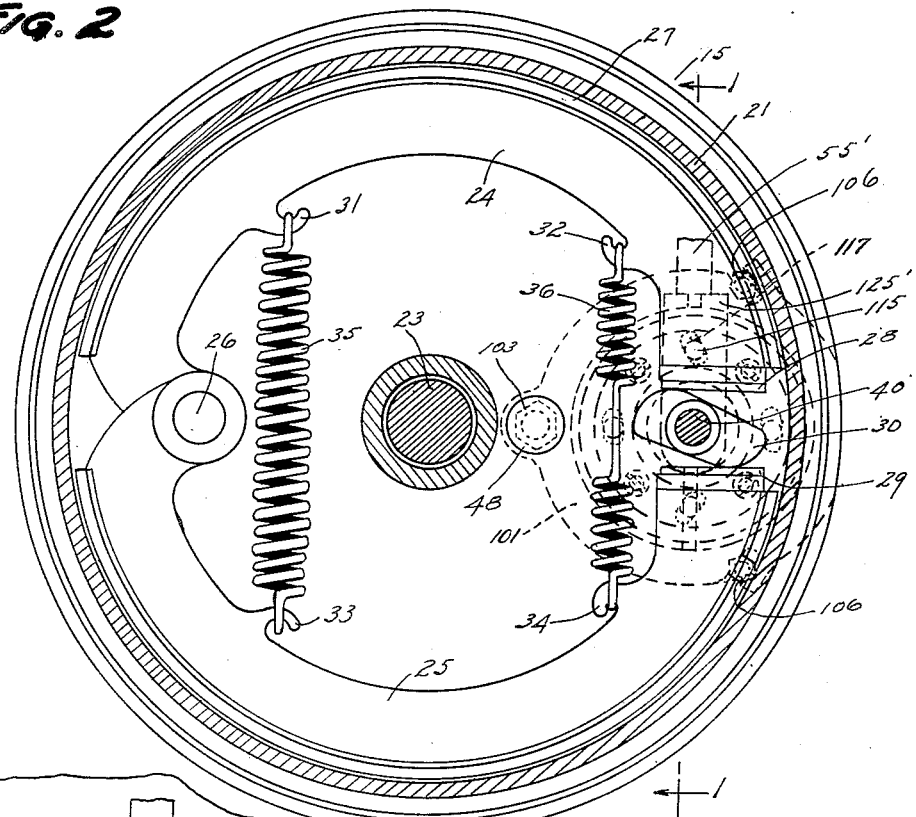
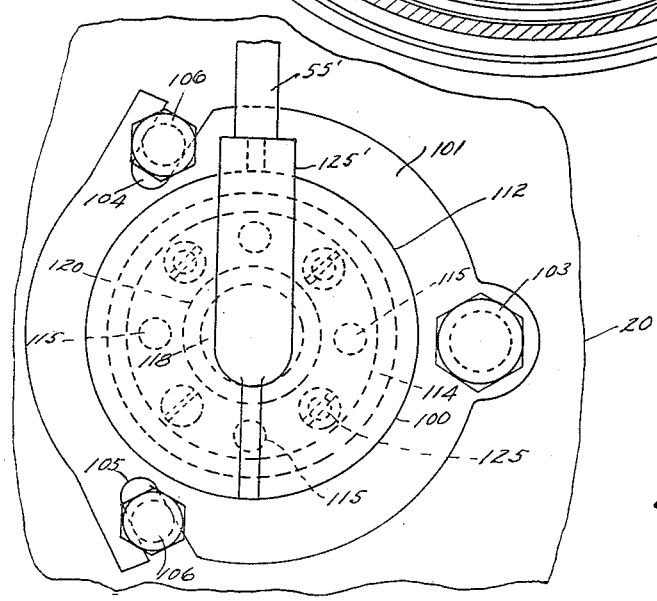
INVENTOR
EUGENE V. TAYLOR
BY
Jn. W. McConkey
ATTORNEY Patented Oct. 31, 1933

1,932,916

UNITED STATES PATENT OFFICE 1,932,916

BRAKE

Eugene V. Taylor, South Bend, Ind., assignor to Bendix Brake Company, South Bend, Ind., a corporation of Illinois Original application October 30, 1926, Serial No. 145,109. Divided and this application May 7, 1928, Serial No. 275,668. Renewed September 15, 1930.

13 Claims. (Cl. 188—152)

This invention relates in general to brakes and is illustrated as embodied in a brake mechanism of the hydraulic type. An object of the invention is to provide simple fluid-power operating means in conjunction with a suitable cam or equivalent applying device, the combined mechanism preferably being adapted to operate a standard multiple shoe brake.

In automobile practice, thus far it has not been feasible to adapt the common type of brake for use in a hydraulic or other fluid-power system without radical changes in construction. Obviously such a brake system would be more readily adapted to ordinary motor vehicles if the common type of retarding mechanism such as the multiple shoe brake could be readily connected to the system without necessitating any expensive changes in either the system or the brake.

I, therefore, propose to provide a novel fluid device adapted to be coupled to a standard multiple shoe brake or other wheel-retarding structure such as the cam-operated brake employed so extensively on automobiles at the present time.

An important feature of my invention relates to the particular type of connection between the fluid system and the brake-applying structure whereby it is possible to convert a linear movement of a non-rotatable part, said movement created by the fluid-power mechanism into a rotary movement of the brake-applying structure, the latter movement being necessary to render the brake operative.

In one desirable arrangement the fluid-power operating structure is pivoted to the conventional backing plate for a brake shoe structure, thereby permitting the shoe operating cam connected to the fluid-operated structure to automatically adjust its position with respect to the shoes.

An important feature of my invention relates to the novel fluid-operated cylinder structure, wherein stationary pins are preferably employed to guide and prevent rotation of the linearly moving hydraulic piston, the latter preferably connected by a helical screw thread with the rotatable brake-applying operating shaft. According to an important minor feature of my invention, the piston operating fluid is admitted to the cylinder by a novelly arranged port preferably positioned on the side of the cylinder as illustrated, the fluid conduit being at right angles to the cylinder axis.

Another minor but important feature of my invention relates to the position of the coupling cylinder with respect to the brake-operating cam or equivalent means in which the axis of both the cylinder and the operating means are made to coincide, one with the other.

The advantages of the arrangements set forth, and various additional features of novelty and desirable details of construction will be apparent from the following description of one illustrated embodiment shown in the accompanying drawings, in which:

Figure 2 is a longitudinal section taken on the line 2—2 of Figure 1 showing the brake structure in elevation, the hydraulic operating structure being shown in dotted lines; and Figure 3 is an enlarged view in end elevation of the hydraulic cylinder and its novel connection with the backing plate.

Figure 1:
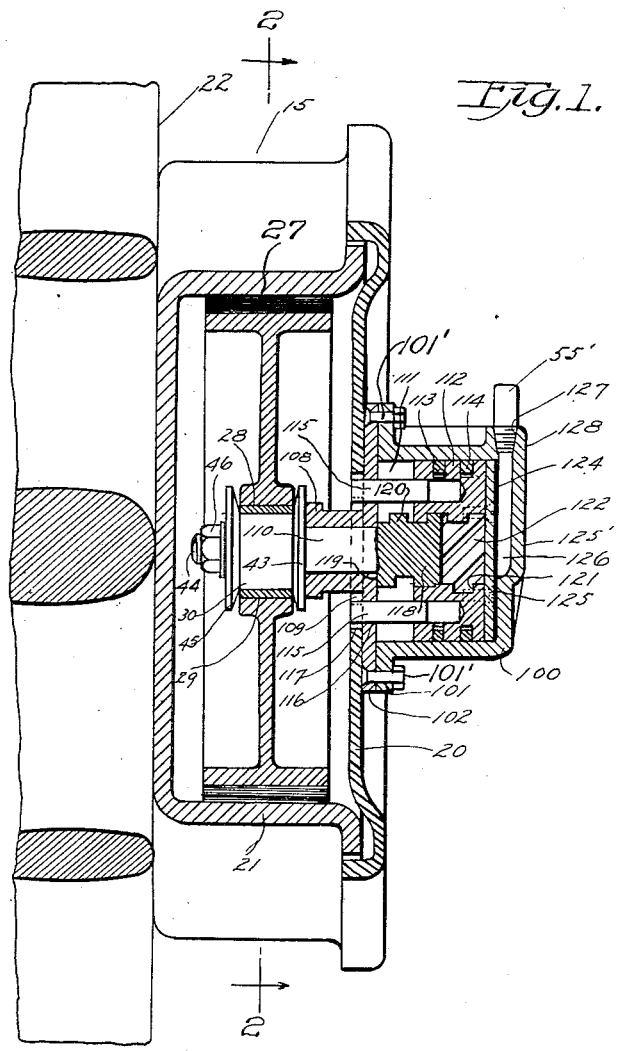
Figure 1 is a fragmentary sectional view taken on line 1—1 of Figure 2 through the brake-operating mechanism embodying the features of my invention.

The particular brake structure selected for illustration includes a backing plate 20 of a brake designated generally by the reference character 15. This plate 20 constitutes a closure piece for the cylindrical brake drum 21 secured to a wheel 22. As best shown in Figure 2, the wheel 22 is mounted upon an axle 23 extending through the drum 21. Disposed inside of the drum 21 is the friction or retarding means, such as a pair of co-operable brake shoes 24 and 25 which are of any conventional structure. These brake shoes are anchored at 26 on a fixed pivot or the like in a manner well known to those versed in the brake art. It is to be understood, however, that although I have only illustrated two shoes, the invention is not to be thus limited, for any desirable number of shoes may be employed without deviating from the features of my invention. For example, the three-shoe brake structure disclosed in Patent No. 1,604,394, dated October 10, 1926, might be employed with my invention, inasmuch as the novelty lies entirely in the actuating mechanism.

The shoes 24 and 25 are preferably provided with suitable friction lining 27 for engagement with the drum 21. The free ends of the shoes 24 and 25 may be provided with cam surfaces 28 and 29 respectively adapted to co-operate with a cam 30 connected to my novel brake mechanism to be hereinafter described. Shoe 24 is provided with a pair of spring hooks 31 and 32 and shoe 25 is provided with a pair of spring hooks 33 and 34 disposed opposite the hooks on the other shoe. One pair of hooks 31 and 33 are connected by a return spring 35 and the other pair of hooks are connected by a return spring 36. The two springs are preferably of the tension type and are adapted at all times to draw the shoes toward each other and out of engagement with the brake drum 21.

One of the springs 35 is positioned adjacent the pivot 26 and the other spring 36 is positioned adjacent the cam 30. These springs are adapted to be overcome by the cam 30 when the same is revolved to spread the shoes 24 and 25 apart for the purpose of braking the drum 21. I shall now proceed to describe in detail the novel brake-operating mechanism associated with cam 30.

The fluid-operated cylinder, indicated generally by the reference character 100, may be provided with an annular flange 101 fastened to a closure plate 102 by bolts 101'. The plate 102 is pivotally connected by the bolt 103 to the backing plate 20 of the associated brake mechanism. The flange 101 and the plate 102 are provided with a pair of spaced arcuate-shaped slots 104 and 105 in each of which is a bolt 106 connected to the plate 20. These bolts 106 co-operate with the slots to limit the pivotal movement of the cylinder 100 and the plate 102.

Connected with the plate 102 is a hub portion 108 which extends through an aperture 109 in the plate 20, said aperture permitting free movement of the cylinder about the pivot point 103. This hub 108 serves as a bearing for the shaft 110 one end of which is connected to a brake cam 30 formed integral with said shaft. Formed integral with the cam is a reduced shaft portion 44 upon which is mounted an annular member or collar 45 held in place by a nut 46 threaded on reduced end 44, said collar co-operating with another collar 43 mounted on the shaft 110. The two collars 43 and 45 co-operate to properly align the ends of the shoes with cam 30 as is obvious from Figure 1.

Positioned within the cylinder 100 is a piston 112 tightly fitted in the bore 111 of the cylinder 100. The piston 112 may be provided with a pair of piston rings 113 for insuring a tight fit of the piston within the cylinder. Piston 112 is adapted to be reciprocated within the cylinder 100 and is guided in its movement by a plurality of guide pins 115 suitably connected thereto. Each of the pins 115 extends through an aperture 116 in the plate 102, preferably having a driving fitting therewith, and through a suitably slotted aperture 117 in the plate 20. Pins 115 are arranged parallel with each other and serve to not only guide the piston but to prevent the piston from being turned.

The end of the shaft 110 which extends into bore 111 of the cylinder 100 is provided with an enlarged portion 118 having a shoulder 119 abutting against the face of the plate 102. This enlarged portion 118 is equipped with a helical thread 120 adapted to engage a helical thread 121 formed integral with the piston 112. In other words, the piston 112 has a threaded aperture 122 into which a portion of the end 118 is fitted. It will be obvious that upon the movement of the piston 112 toward the plate 20 the portion 118 will be caused to rotate, thus actuating the cam or other brake-applying mechanism.

One end of the aperture 122 in the piston 112 is closed by a closure plate 124 secured to the piston by means of screws 125. Also the associated end of the cylinder 100 is provided with a raised portion 125' defining an inlet 126 communicating with an opening 127 in a lateral boss 128 preferably formed integral with the cylinder. A pipe line 55' may be threaded into the opening 127 and connects the bore of the cylinder 100 with a suitable fluid-power system (not shown). It is to be noted that the fluid inlet boss 128 is positioned in the side of the cylinder and at the end thereof, not in the end face as is the usual practice.

The operation of my invention is believed to be obvious from the foregoing detailed description of the same. Upon the application of force or pressure to the fluid in the pipe line 55', the piston 112 will be forced toward the plate 102. In this movement of the piston, the rods or pins 115 serve to guide the same and to prevent the piston from rotating. The screw thread 121 in the aperture 122 serves to cause the portion 118 to be revolved as the piston 112 is moved forward. This results in the actuation of the brake cam 30. When the piston 112 is relieved of the hydraulic or other fluid pressure, the springs associated with the brake shoes will serve to return the parts to their normal positions shown in Figure 2. In other words, I purposely make the springs associated with the brake shoes of sufficient strength to cause them, when tensioned, to force the piston 112 back to its initial position through the means of the shaft 110.

A simple and efficient brake-operating mechanism is thus produced combining the advantages of a fluid-power operating system or "hook-up" with the well-known advantages of the mechanically operated brake shoes, the structure illustrated effecting a translation of the linear movement of the fluid-operated structure into the necessary rotary movement for the cam mechanism.

While one illustrative embodiment of my invention has been described in detail, it is not my intention to limit its scope to that particular embodiment or otherwise than by the terms of the appended claims. Most of the subject-matter herein claimed is to be regarded as divided from my prior application No. 145,109, filed October 30, 1926.

I claim:

1. In a brake-operating mechanism, a brake drum, a closure plate therefor, a friction device within said drum, rotatable means within said plate for rendering operative said friction means and non-rotatable means, rendered so by means co-operating with said plate, said non-rotatable means co-operating with said rotatable means and effecting, by linear movement thereof, a rotary movement to said rotatable means.

2. In a brake assembly, a brake drum and closure plate therefor, a friction device within said drum, and operating means for said friction device comprising a rotatable part within said drum and a non-rotatable hydraulically-actuated means, capable of reciprocating linear movement, co-operating with said first-mentioned part and rendered non-rotatable by means co-operating with said closure plate, said hydraulically-actuated means effecting, by linear movement, rotation to said rotatable part.

3. In combination, a cam-operated brake, a fluid power operator for controlling the operation of said cam, means for coupling the cam to said operator comprising a rotatable part connected to said cam and a non-rotatable part connected thereto effecting, by linear movement thereof, rotation to said rotatable part, and means associated with said coupling means for enabling the brake cam to be self-centering with respect to the parts of the brake.

4. In a brake assembly, a brake drum and friction means therefor, a closure plate, friction operating means passing through said plate and surrounded by a sleeve, the latter provided with a radially extending flange at the sleeve end, a hydraulic cylinder attached to said flange, a piston in said cylinder, and guide means fixed to said flange, one end of said guide means extending into the piston and the other end extending into the closure plate.

5. In a brake-operating structure having a friction brake, a rotatable brake-operating part and a non-rotatable hydraulically actuated part co-operating therewith, both parts having a common axis, said latter part effecting, by linear movement thereof, rotation to said rotatable part to apply said brake, and means associated with said brake for returning said parts to normal position.

6. In a brake-operating mechanism, a brake drum, a closure plate therefor, a friction device within said drum and operating means therefor comprising a rotatable part passing through said plate and a non-rotatable hydraulically-actuated part connected to and aligned with said rotatable part and housed by a member connected to said closure plate, said latter part effecting, by linear movement thereof, a rotary movement to said rotatable part.

7. In a brake-operating structure having a friction brake, a rotatable brake-operating part and a non-rotatable part capable of reciprocating linear movement co-operating therewith, both parts having a common axis, said latter part effecting, by its linear movement, rotation to said rotatable part to apply said brake, and means associated with said brake for returning both said parts to normal position.

8. A device for use in hydraulic brake systems having a brake drum, friction means therein and a backing plate for said drum, brake-operating member for said friction means and means for said drum comprising a cylinder carried by said plate, said cylinder having a fluid inlet port, a piston in said cylinder, and a shaft extending into the said cylinder and into an opening in said piston, said piston and shaft so connected that a linear movement of the former effects a rotary movement of the latter.

9. A device for use in hydraulic brake systems, a backing plate, a brake operating member, and means for operating said member comprising a cylinder having a fluid inlet port, a piston in said cylinder, means associated with said plate for rendering said piston non-rotatable and a rotatable shaft extending into the said cylinder and into an opening in said piston, said piston and shaft so connected that a linear movement of the former effects a rotary movement of the latter.

10. In a brake assembly, a brake drum and friction means therefor, a closure plate, friction operating means freely passing through said plate and surrounded by a sleeve, the latter provided with a radially extending flange at the sleeve end, a hydraulic cylinder attached to said flange, a piston in said cylinder, and guide means fixed to said flange, one end of said guide means extending into slots in the piston and the other end extending into the closure plate.

11. In a coupling device for use in a hydraulic brake system, a cylinder and a piston therefor said piston including a detachable end plate closing a helically threaded opening in said piston.

12. A brake operating structure comprising in combination, a drum; a friction element within the drum; a backing plate; a brake operating member; and means for operating said member passing through said backing plate and including a rotatable part and a non-rotatable, hydraulically actuated part cooperating with and having a common axis with said rotatable part, said member being directly connected with said rotatable part and linear movement of said non-rotatable part causing rotation of said rotatable part.

13. A brake operating structure comprising, in combination a brake operating member and means for operating said member including a rotatable part, and a non-rotatable hydraulically actuated part cooperating with and having a common axis with said rotatable part, said member being directly connected with said rotatable part and said non-rotatable part effecting, by a linear movement thereof, rotation to said rotatable part.

EUGENE V. TAYLOR.